US007281435B2

United States Patent
Sale et al.

(10) Patent No.: US 7,281,435 B2
(45) Date of Patent: Oct. 16, 2007

(54) MEASUREMENT OF NON-AQUEOUS PHASE LIQUID FLOW IN POROUS MEDIA BY TRACER DILUTION

(75) Inventors: Thomas C. Sale, Fort Collins, CO (US); Geoffrey R. Taylor, Franktown, CO (US); Mark Lyverse, Lafayette, CA (US)

(73) Assignees: Colorado State University Research Foundation, Fort Collins, CO (US); Chevron U.S.A. Inc., San Ramon, CA (US)

( * ) Notice: Subject to any disclaimer, the term of this patent is extended or adjusted under 35 U.S.C. 154(b) by 187 days.

(21) Appl. No.: 11/283,055

(22) Filed: Nov. 18, 2005

(65) Prior Publication Data

US 2007/0113676 A1 May 24, 2007

(51) Int. Cl.
*G01F 1/704* (2006.01)
(52) U.S. Cl. .................. 73/861.07; 73/861.95
(58) Field of Classification Search ............ 73/861.07, 73/861.95, 61.43, 863.23, 863.41
See application file for complete search history.

(56) References Cited

U.S. PATENT DOCUMENTS 5,062,292 A * 11/1991 Kanba et al. ............... 73/19.01

6,427,526 B1 * 8/2002 Davison et al. ............ 73/61.55
7,207,228 B2 * 4/2007 Wang ....................... 73/861.07

OTHER PUBLICATIONS

Drost et al., "Point Dilution Methods of Investigating Ground Water Flow by Means of Radioisotopes," 1968, pp. 125-146, vol. 4, No. 1, Water Resources Research, US.
Freeze, R. Allan et al., "Groundwater," 1979, pp. 426-429, Prentice-Hall, Inc., Englewood Cliffs, New Jersey. US.
Taylor, Geoffrey Ryan, Thesis "Direct Measurement of LNAPL Flow in Porous Media Via Tracer Dilutions," Colorado State University, Fort Collins, CO. US; made available to the public in Dec. 2004.

* cited by examiner

*Primary Examiner*—Jewel Thompson
(74) *Attorney, Agent, or Firm*—Samuel M. Freund; Cochran Freund & Young LLC

(57) ABSTRACT

A method and apparatus for measuring in situ flow of non-aqueous phase liquids (NAPLs) through a porous medium is described. A tracer is introduced into a well or boring located in the medium and the tracer concentration in the well kept uniform by mixing. The rate at which the tracer is depleted from the well has been determined to be proportional to the flow rate of the NAPL through the well or boring and surrounding formation.

20 Claims, 12 Drawing Sheets

MEASUREMENT OF NON-AQUEOUS PHASE LIQUID FLOW IN POROUS MEDIA BY TRACER DILUTION

FIELD OF THE INVENTION

The present invention relates generally to the measurement of flow of liquids through porous media and, more particularly, to the measurement of flow of non-aqueous phase liquids (NAPLs) through porous media underlying a site where a chemical release has occurred by measuring the concentration of a tracer introduced into a well or boring located within the site and in the path of the flow, as a function of time.

BACKGROUND OF THE INVENTION

Non-aqueous phase liquids include a range of industrial chemicals that are basic building blocks of a modern society. Non-aqueous emphasizes the fact that the liquids are immiscible with water. Two common classifications of NAPL are Light Non-Aqueous Phase Liquids (LNAPL) and Dense Non-Aqueous Phase Liquids (DNAPL), the light and dense prefixes denoting the fluid density compared to that of water; LNAPL will float on water, while water will float on DNAPL. Common examples of NAPL include fuels, solvents, lubricants, wood preservatives, and chemical feedstock.

Large quantities of NAPLs have been released into the subsurface, forming contiguous bodies of separate phase liquids. The selection of suitable remediation strategies for handling NAPL releases is influenced by the rate at which the NAPL is moving in these bodies. As a result, a number of techniques have been developed to measure the migration, or flow rate, of NAPLs in the subsurface. These methods may be time consuming, costly and potentially inaccurate. Results often depend on a number of parameters that can vary widely from point-to-point and are therefore estimated and/or averaged. One method involves collecting soil cores, conducting complex laboratory studies, fitting the laboratory results to empirical models, and using these models to predict future NAPL migration. Potentially large errors may be introduced in each step.

Conventional tracer dilution techniques measure the dilution of a tracer, placed into a well or boring to determine the flow rate of water through the well. The water flow rate through the well is then used to calculate the in situ flow rate of groundwater. Thus, observed dilutions of salt or radioactive isotope solutions as a function of time are used to estimate groundwater flows. The more rapidly the tracer concentration diminishes from the well or boring, the faster the flow of water.

The hydraulic influence of the well in the formation must be accounted for since a well is generally more conductive than the surrounding formation. Therefore, flow tends to converge toward the well and the flow through the well increases relative to the formation. In addition, tracer decay as a function of time may be related to a number of non-flow processes. For example, tracer adsorption, biodegrading loss due to in-well mixing, and density driven flow, can contribute to the loss of tracer with time. Presently, tracer dilution of salt solutions is a generally accepted method to estimate the groundwater flow. Another disadvantage of using salt tracers is related to the higher density of the salt solutions than the surrounding water. This can cause the tracer solution to exit the well due to negative buoyancy, even under static conditions.

A discussion of multiphase flow in porous media, and a summary of previous work using the tracer dilution method are described in the thesis entitled "Direct Measurement Of LNAPL Flow In Porous Media Via Tracer Dilutions" submitted by Geoffrey Ryan Taylor in partial fulfillment of the requirements for the Degree of Master of Science at the Colorado State University in Fort Collins, Colo. which was published on Dec. 10, 2004, which is hereby incorporated by reference herein for all that it discloses and teaches.

Accordingly, it is an object of the present invention to provide a method and apparatus for direct measurement of in situ flow of NAPL.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the tracer dilution method measuring the flow rate of NAPL through a porous medium, hereof includes the steps of: placing a well or boring in the porous medium in the path of the flow of the NAPL, whereby the NAPL establishes a column within the well having a height; introducing a chosen quantity of tracer into the well or boring; mixing the tracer with the NAPL in the well or boring such that the resulting mixture is uniform; measuring the tracer concentration as a function of time, thereby generating a data set characteristic of the flow of the NAPL; correcting the data set for the convergence of the NAPL flow into the well, forming thereby a corrected data set; and extracting the rate of flow of the NAPL from the corrected data set.

In another aspect of the present invention, and in accordance with its objects and purposes, the tracer dilution apparatus for measuring the rate of flow of NAPL through a porous medium hereof, includes in combination: a well or boring located in the porous medium in the path of the flow of the NAPL; means for introducing a tracer into the well; means for uniformly mixing the tracer with the NAPL; and means for measuring the concentration of tracer as a function of time, generating thereby a data set characteristic of the flow of the NAPL.

In still another aspect of the invention, in accordance with its objects and purposes, the diffusive mixing apparatus for a liquid having at least two components hereof includes: a pump having an input and an output; a body; at least one first tube mounted on the body and submerged in the liquid to be mixed, having an open end and a closed end and a plurality of holes or slots through the walls thereof such that the liquid can pass therethrough for receiving liquid to be mixed from the output of the pump through the open end thereof; and at least one second tube mounted on the body, submerged in the liquid to be mixed, having an open end in fluid contact with the input of the pump and a closed end, and a plurality of holes or slots through the walls thereof such that the liquid can pass therethrough from outside thereof.

Benefits and advantages of the present invention include, but are not to be limited to, the direct measurement of the rate of flow of NAPLs by tracer dilution in a well or boring.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 10A is a graph of the test tank dilution results for a LNAPL flow of 0.17 $m^3$/m/yr and a thickness of 9 cm, while

DETAILED DESCRIPTION

Briefly, the present invention includes an apparatus and method for measuring in situ flow of non-aqueous phase liquids (NAPLs). A chosen quantity of tracer is introduced into the NAPL in a well or boring, and the tracer concentration in the NAPL is kept uniform in the region of measurement over time by continuous mixing. The rate at which the tracer is depleted from the well or boring is proportional to the flow rate of NAPL through the well or boring. Although the following experiments describe a LNAPL application, the present invention is equally applicable to wells or borings containing DNAPL.

Conventional tracer dilution methods for water are not applicable to NAPL since the tracer is chosen to be soluble in the NAPL and not in water in which the NAPL may be in contact. Additionally, the desired range of flow measurement is far lower for NAPL than for water, such measurements requiring that the tracer remains well mixed in the NAPL, and greater measurement accuracy for tracer concentrations.

Figure 1:
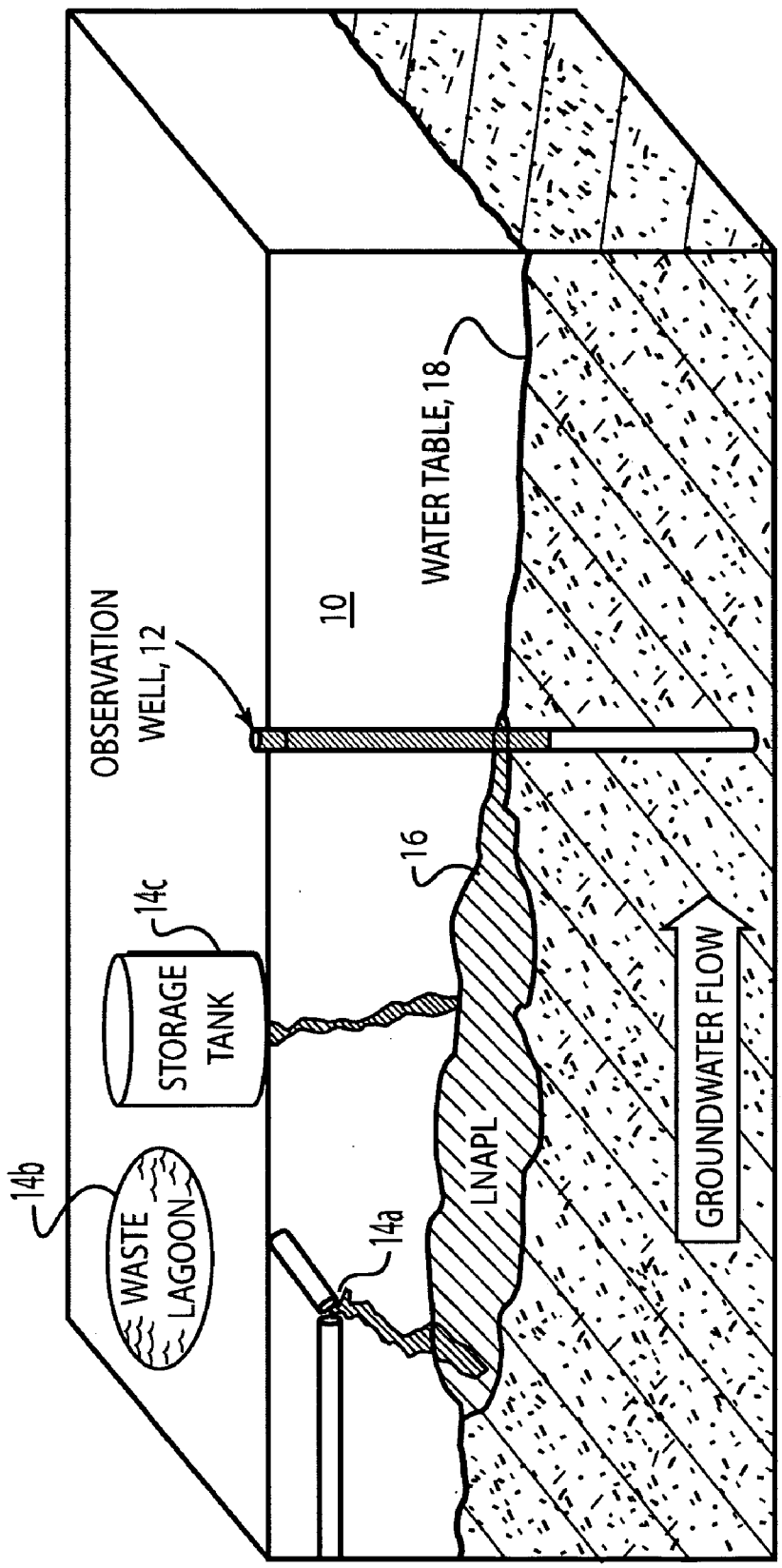
FIG. 1 is a schematic representation of a porous medium having an observation well located therein, and potential sources for LNAPL flow, such as a broken pipe, a waste lagoon, or a leaking storage tank.

Reference will now be made in detail to the present preferred embodiments of the invention examples of which are illustrated in the accompanying drawings. In what follows, identical callouts will be used for similar or identical structure. Turning now to FIG. 1, a schematic representation is shown of porous medium, 10, having an observation well, 12, located therein, and potential sources of LNAPL, such as a broken pipe, 14a, a waste lagoon, 14b, or a leaking storage tank, 14c, as examples. The underground LNAPL pool, 16, occurs at the water table, 18.

Figure 2:
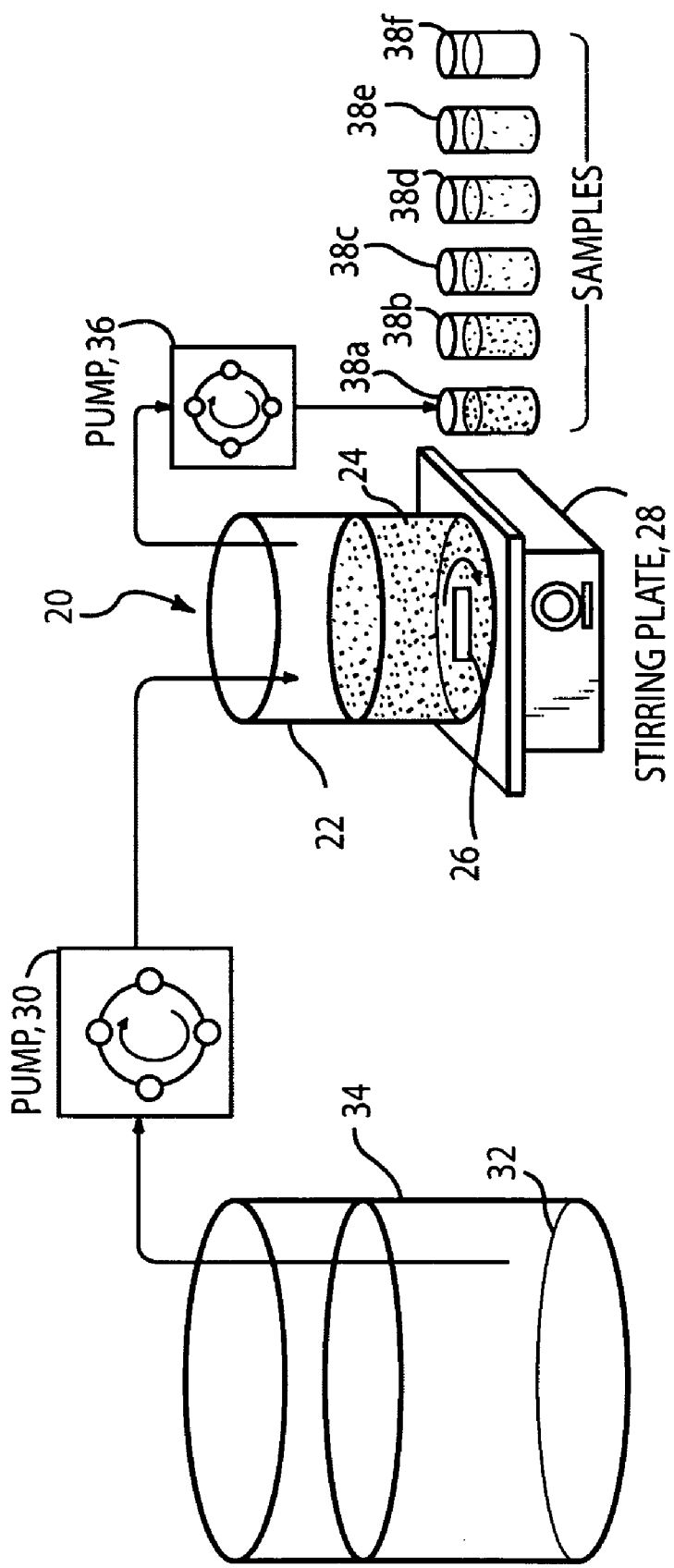
FIG. 2 is a schematic representation of a mixing cell suitable for deriving the equations describing the present tracer dilution measurements.

It has been observed by the present inventors that NAPL in a well or boring at steady state can be represented by a mixing cell. FIG. 2 is a schematic representation of mixing cell, 20, useful for deriving the equations describing the present tracer dilution measurements. Shown is container, 22, containing oil mixed with a tracer, 24 (Solitrol 220 as the LNAPL, and 2,5 Diphenyloxazole (PPO) as a fluorescent tracer, respectively, as examples), and having magnetic stirring bar, 26, rotated by magnetic stirrer, 28. Liquid pump, 30, pumps additional LNAPL, 32, into container 22 from container, 34. Liquid pump, 36, pumps the increasingly dilute, tracer/oil mixture out of container 22 at a chosen rate, into sample vials 38a, 38b, 38c, and 38f, in that order, for analysis. It may be schematically observed in FIG. 2 that the fluid in the sample vials becomes more dilute (lighter in color) as time progresses, due to the influx of LNAPL. Fluorescence intensity was measured for the liquids in vials 38a-38f, and the concentration of the tracer was determined. Concentration as a function of time data was then fitted to the mathematical model for a mixing cell set forth hereinbelow to determine the flow rate of the LNAPL.

Criteria for choosing a tracer include: (1) Little effect on LNAPL fluid properties (density, viscosity, LNAPL-water interfacial tension, and LNAPL-air interfacial tension); (2) Easily detected; (3) Low toxicity; (4) Insoluble in water; (5) Chemically stable; and (6) Little interaction with well materials. One tracer which was found to meet these criteria is Stay-Bright™, part number BSL 715006, a concentrated fluorescent dye used in the automotive industry for detecting oil leaks. BSL 715006 fluoresces in the yellow region (around 580 nm) electromagnetic spectrum, which makes this tracer easy to detect and to distinguish from other fluorescent signals encountered in LNAPL. The tracer is completely soluble in LNAPL, detectable at concentrations of less than one part per million, insoluble in water, and has a relatively low toxicity when compared with compounds commonly encountered in LNAPL bodies.

Of the mixing systems tested, the diffusive mixer to be described hereinbelow was found to minimize mixing-related hydraulic gradients that can drive NAPL with tracer out of the well or boring. With the assumption that the tracer is well mixed with the LNAPL, the concentration of the tracer as a function of time can be calculated using the mixing cell model described hereinabove. This time-dependent concentration is related to the flow through the well by:

$$C(t) = C_o e^{-\frac{Q}{V} t}, \qquad (1)$$

where: $C(t)$=tracer concentration as a function of time; $C_o$=initial concentration at time zero; $Q$=flow rate through the well; $V$=volume of the well; and $t$=time.

By measuring the tracer concentration as a function of time and fitting Equation (1) to the data, the rate of flow of the NAPL through the well or boring can be calculated.

Figure 3:
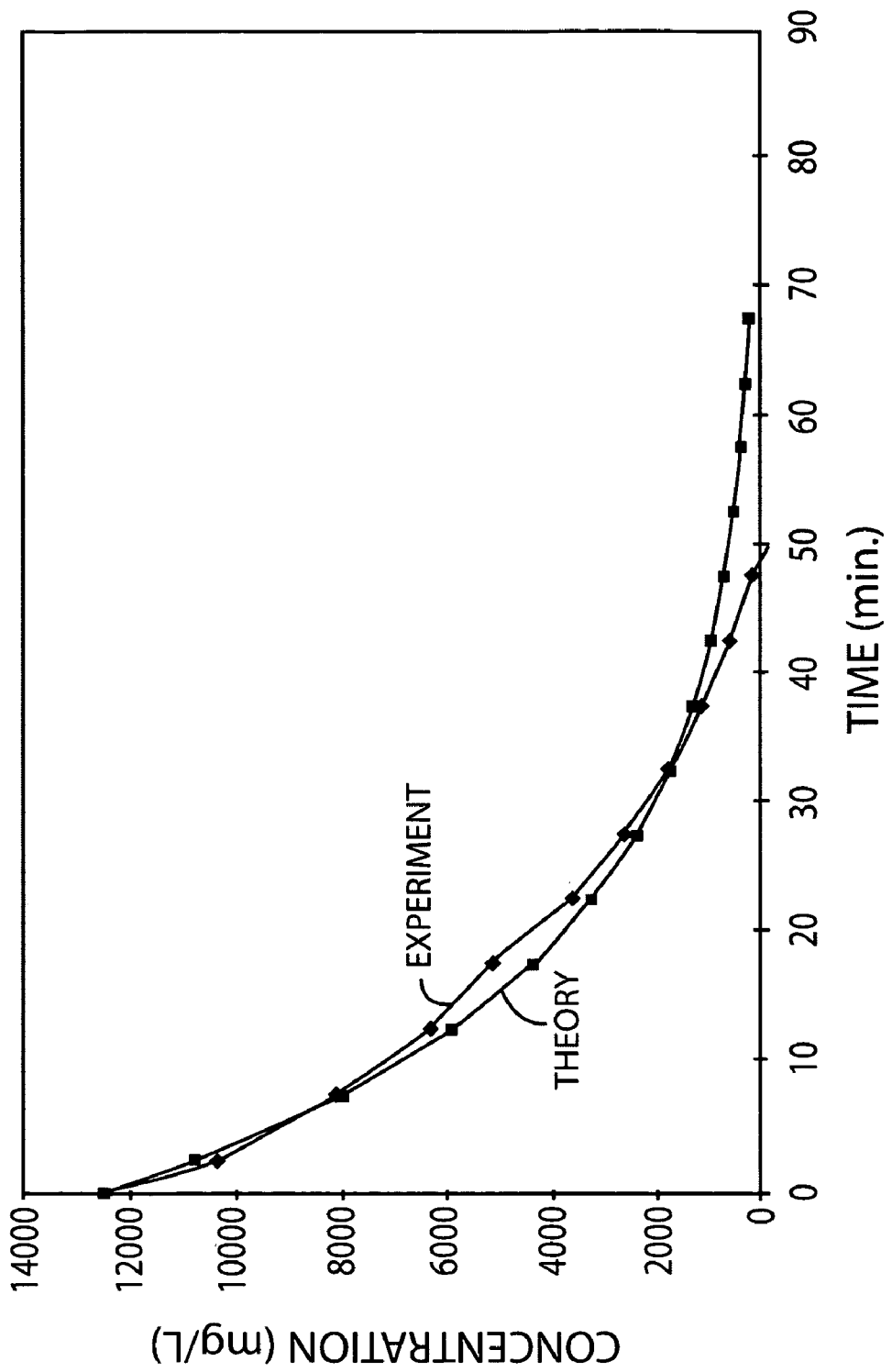
FIG. 3 is a graph of the tracer concentration as a function of time derived from the mixing cell apparatus illustrated in FIG. 2 hereof.

FIG. 3 is a graph of the tracer concentration as a function of time. A least squares regression was used to fit Equation (1) to the concentration data. The analysis gave an estimated a flow rate of 2.98 ml/min., while the measured flow rate was 3.00 ml/min. The tracer dilution method is therefore based on the change in concentration of the tracer as a function of time, and it is has been observed that the fluorescence intensity is linearly proportional to the concentration. Thus, the fluorescent intensity may be substituted for the tracer concentration, and fluorescent tracers can be used to accurately predict flow rates through a mixing cell.

The volume (V) can be defined for a well as:

$$V = \pi \left(\frac{D}{2}\right)^2 b_w - V_{mixer}, \qquad (2)$$

where: D=Well diameter (L); $b_w$=Equilibrium thickness of the LNAPL column in the well; and $V_{mixer}$=Displacement of the mixing device ($L^3$). Substituting Equation (1) into Equation (2) results in:

$$C(t) = C_o \cdot e^{\frac{-Q_w}{\pi \left(\frac{D}{2}\right)^2 b_w - V_{mixer}} t} \qquad (3)$$

Other metrics for describing NAPL movement such as the volumetric flow per-unit-width of LNAPL body perpendicular to the NAPL flow, the Darcy flux, the mean seepage velocity, and the mean NAPL conductivity from the results of tracer dilution tests, may now be calculated.

The volumetric flow rate through a well may be converted to a volumetric flow rate per unit width of NAPL body, perpendicular to NAPL flow, through a formation has units of volume per length per time ($L^3/L/T$) is given by:

$$Q'_F = \frac{Q_w}{\alpha_o \cdot D}, \qquad (4)$$

where the convergence factor, $\alpha_0$, is the observed flow divided by the actual flow, and is necessary to account for the permeability contrast between the well and the formation. For NAPL flow, no documentation is available for this number, but the tank experiments set forth hereinbelow yield a convergence equal to approximately one tracer diameter, or 1.5 times the well screen diameter. In multiphase flow, the LNAPL conductivity is not uniform; even under ideal conditions, the conductivity varies vertically. When other data are not available, using a range of convergence factors from 1 to 2 will produce a range of reasonable values.

The volumetric NAPL flux, or Darcy flux, which is a common measure of migration, is the rate at which fluid moves through a cross sectional area perpendicular to flow, and can be calculated using:

$$\bar{q}_n = \frac{Q'_F}{b_f}, \qquad (5)$$

where $b_f$=Height of continuous LNAPL in the formation, which can be estimated as the height in the well. This approximation neglects the capillary and displacement pressures and will typically overestimate the thickness of continuous LNAPL in the formation. This approximation can be improved by accounting for the displacement pressure through:

$$b_f = b_w - h_d, \qquad (6)$$

where: $h_d$=displacement head (cm). The displacement head can be measured via soil cores or can be estimated by:

$$h_d = 9.6 \left(\frac{\rho_w}{\Delta \rho}\right)\left(\frac{\sigma_w}{\sigma_n}\right)\left(\frac{K}{\phi}\right)^{-0.403}, \qquad (7)$$

where: K=saturated hydraulic conductivity (cm/s); $\rho_w$=density of water ($M/L^3$); $\Delta\rho$=density difference of water and NAPL ($M/L^3$); $\sigma_w$=interfacial tension between water and air (F/L); $\sigma_n$=interfacial tension between water and LNAPL (F/L); and $\phi$=porosity of the porous medium.

The mean seepage velocity of NAPL can also be calculated from a unit volumetric flow rate in the formation as:

$$\bar{v}_n = \frac{\bar{q}_l}{\phi \bar{S}_n} = \frac{Q'_f}{\phi \bar{S}_n b_f}, \qquad (8)$$

where: $\bar{S}_n$=Average LNAPL saturation in the formation. The transmissivity to NAPL can be determined from the volumetric flow rate per unit width, perpendicular to flow, and the NAPL gradient by:

$$\bar{T}_n = -Q'_f \left(\frac{dh_n}{dx}\right)^{-1}, \qquad (9)$$

where: $Q'_f$=unit volumetric flow rate; $h_n$=height of NAPL above a datum; and x=direction of flow. The average LNAPL conductivity can then be determined by:

$$\bar{K}_n = \frac{\bar{T}_n}{b_f} \qquad (10)$$

A dimensionless analysis of data collected during tracer dilution tests may provide insights into how well the data fits the model, and into processes that may affect the results. Equation (1) for the mixing cell can be rewritten as:

$$C(t)=C_o e^{-\alpha \cdot t}, \qquad (11)$$

where: $\alpha$=has been substituted for the term Q/V. Dimensionless parameters for the concentration, time and rate constant may be defined as:

$$C'(t) = \frac{C(t)}{C_o}; \qquad (12)$$

$$t' = \frac{t}{t_{1/2}}; \text{ and} \qquad (11)$$

$$\alpha' = \alpha t_{1/2}, \qquad (14)$$

where: C'(t)=normalized concentration; t'=dimensionless time, normalized to $t_{1/2}$; $t_{1/2}$=time to dilute the tracer concentration by a factor of 2; and $\alpha'$=dimensionless rate constant. Solving for C(t), t, and $\alpha$ yields:

$$C(t) = C'(t)C_o; \quad (15)$$

$$t = t't_{1/2}; \text{ and} \quad (16)$$

$$\alpha = \frac{\alpha'}{t_{1/2}}. \quad (17)$$

Substitution of Equations (15), (16) and (17) into Equation (11) and simplifying results in:

$$\log(C'(t')) = \frac{-\alpha}{2.303}. \quad (18)$$

Applying the boundary condition when t'=1, C' (t')=½ yields:

$$\alpha' = 0.693, \text{ and} \quad (19)$$

$$t_{1/2} = \frac{0.693}{\alpha}. \quad (20)$$

Note that α' is a constant; that is, by plotting the data in this dimensionless format, the slope will be ~0.693 regardless of the NAPL flow rate. When α' does not have the expected slope, or varies with respect to t', it is likely that other mechanisms are affecting the tracer dilution.

Several assumptions employed in the process of employing the mixing cell model are now presented.

(1) Steady flow ($Q_{in}=Q_{out}=Q_w$), which requires the volume in the well to be constant. For a mixing cell, this is a good assumption, as it is easy to keep the volume constant. However, in an actual well or boring, the NAPL thickness, and thus the NAPL volume, may vary with movement of the water table. Therefore, in order to maintain a constant volume of NAPL in the well and thus obtain accurate results, the water table should be stable. If the water table were to rise during a tracer dilution test, the volume of the well would decrease as more NAPL and tracer flowed from the well than entered. In fact, during a rising water table, the NAPL inflow rate would likely be very small or zero. With no inflowing NAPL, the tracer concentration would not be diluted, and the test would suggest a low or zero flow through the well when, in fact, a large volume of NAPL may actually be flowing. Conversely, if the water table were to fall, the NAPL thickness in the well would increase, thereby diluting the tracer and a high flow rate would be predicted.

(2) Complete mixing of the tracer in the well. Without mechanical mixing, the tracer will not remain well mixed under most conditions, and the tracer dilution may not follow Equation (1). Mixing too vigorously, by contrast, may induce tracer losses which are not associated with the natural flow through the well.

(3) Well construction may influence results. Some well completion techniques leave a layer of fine material about the annulus of the well bore, either bentonite slurry or naturally occurring fine materials. This layer of fine material may reduce NAPL flow through the well.

(4) Well screen selection may influence results. The well must be screened over the entire layer of continuous NAPL, since partially screened wells inhibit flow and may result in underestimating the NAPL flow in the formation. Screen materials should be non-reactive. For example, screens constructed from PVC material may swell in the presence of NAPL, perhaps significantly reducing flow.

(5) The principal source of tracer dilution is the flow through the well bore. There are a number of loss mechanisms that can affect the rate at which the tracer is diluted. If these loss mechanisms are large compared with flow through the well then the tracer will disappear faster, and a higher flow than actually exists will be calculated.

Other potentially significant loss mechanisms that may affect the results include:

(a) Diffusion: by introducing the tracer in the well or boring there is a concentration gradient between the NAPL in the well and that in the formation, resulting in a diffusive flux from the well into the formation. Calculations indicate that the tracer losses through diffusion are not significant relative to the advection from flow through the well, and can be neglected.

(b) Volatilization: If the tracer contains volatile constituents at high concentrations, it is possible that some of the tracer may volatize from the NAPL, resulting in a decreased concentration. However, at low concentrations the effects of volatilization are minimal, and may be neglected.

(c) Adverse Mixing: If flow is small and the mixing rate high, it may be possible that poor mixing techniques could cause a gradient from the well into the formation, or vice-versa, resulting in an artificially high flow rate prediction. By using the diffusive style mixer described hereinbelow, effects of adverse advection may be minimized.

(d) Heating: If the mixing or monitoring of the concentration adds energy, it may be possible for the NAPL in the well to expand, migrate outward and remove tracer from the well, without causing a volume change. By minimizing the amount of energy used in the well, the heating effects can be neglected.

(e) Density Differences: If addition of the tracer to the NAPL affects the density of the NAPL, this will induce a gradient in the well and cause the tracer to dilute at an artificially high rate. However, by using small concentrations of a tracer having a similar density to the NAPL, such gradients may be prevented.

Most of these loss mechanisms may occur early in the process when the tracer concentration is at its maximum. Therefore, by allowing time to elapse between the tracer introduction and the beginning of testing, the effects of these other loss mechanism can be further reduced.

As will be described hereinbelow, in order for the NAPL/tracer solution in a well or boring to be properly mixed a diffusive mixer adapted for this purpose was developed.

In summary, the present invention includes an apparatus and method for introducing a detectable tracer into NAPL in a well or a boring; using a diffusive mixer to keep the tracer well-mixed in the NAPL; recording the concentration of the tracer in the NAPL as a function of time; downloading the data onto an electronic data logger, a lap top or other computer, or a palm pilot; and using the recorded data to estimate the rate of NAPL flow in the vicinity of the well or boring.

In some situations, it may be advantageous to download data by a wireless connection to a more suitable site for analysis. In the case of a fluorescent tracer, tracer concentrations in the NAPL may be determined using a temperature-controlled spectrometer located at grade, and downhole fiber optic cables for both fluorescence excitation and detection. If the spectrometer is not temperature controlled, the temperature may be measured and recorded during the course of the measurements, and the spectroscopic measurements corrected therefor.

Moreover, since many NAPLs create an explosive atmosphere in the subsurface environment, an explosion-proof apparatus for the down-hole measurements may be used advantageously. For example, an explosion proof downhole mixing pump driven by air, electricity or a speedometer cable. An explosion-proof, temperature-controlled surface housing may be provided to shelter the spectrometer and the data logger.

Low NAPL flow rates result in extended monitoring periods for which remote access to data and an ability to remotely modify system-operating parameters are also an advantage. Solar panels with battery backup may eliminate the need for line power from distant sources for long measurement periods. Pressure transducers may be used to track water levels during the measurements, and the results recorded.

The resultant data may be used for establishing appropriate measures for managing subsurface NAPL bodies.

Having generally described the present invention, the following EXAMPLES will provide additional details.

EXAMPLE 1

Larger scale tests were performed to test the NAPL tracer dilution technique on a scale similar to that found in the field. Tank tests were conducted with LNAPL flows of between 0.035 $m^3$/m/yr and 7.2 $m^3$/m/yr, and LNAPL thicknesses in the formation of between 9 and 24 cm. Objectives of these tests included: (1) Demonstration that the tracer dilution technique may be applied to LNAPL to predict flow rate through a well; (2) Determination that the accuracy of the tracer dilution method could predict meaningful LNAPL flow rates; (3) Investigation of the range of flow rates for which the method can be applied; and (4) Understanding LNAPL flow convergence around an observation well.

Figure 4:
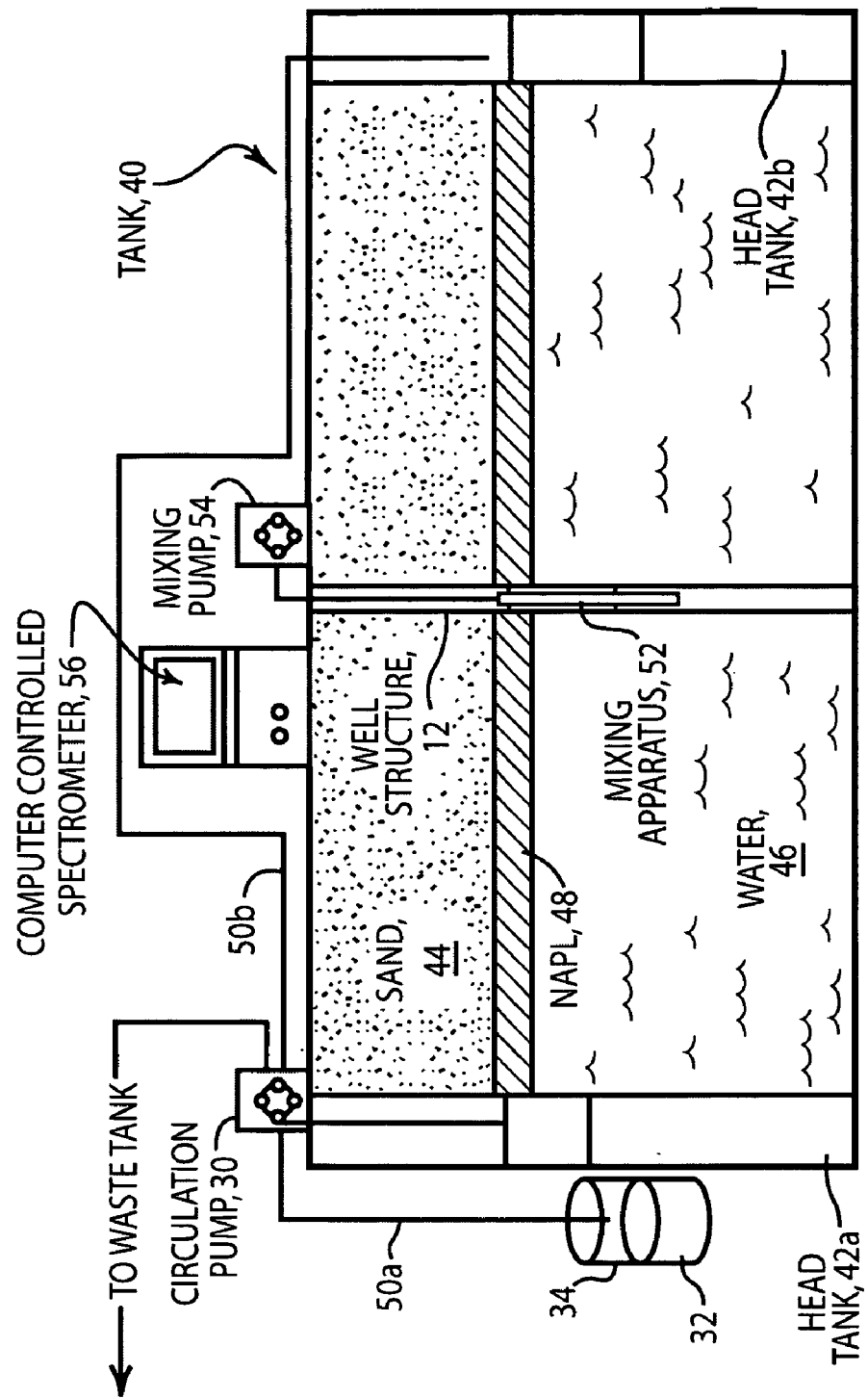
FIG. 4 is a schematic representation of one embodiment of a laboratory apparatus for testing the present invention.

Steel tank, 40, schematically illustrated in FIG. 4 hereof, was 1.2 m high (4 ft.), 2.4 m wide (8 ft.) and 0.15 m thick (0.5 ft.), and had a single glass face. Head tanks, 42*a* and 42*b*, were installed at each end to introduce, recover and monitor fluid levels. Tank 40 was filled with uniform sand, 44, Unium 4095 (95% of the sand being retained on a #40 sieve). Well structure, 12, was constructed at the midpoint of the tank by placing a semi-circular section of stainless steel well screen (5 cm (2 in.) ID with 0.5 mm (0.020 in.) slots cut in half-longitudinally) against the glass face such that the LNAPL could be observed in the well and in the formation. A gravel pack was constructed about the well screen by filling the annulus between the well screen and a piece of 7.6 cm (3 in.) PVC pipe with 2095 Unium sand (95% of the sand being retained on the #20 sieve). After the-tank was filled with sand, the PVC pipe was carefully removed, leaving a uniform layer of course sand approximately a ¼ in. thick surrounding the well screen. The tank was fully filled with water to wet the media, and subsequently drained to create a water table, 46, in approximately the middle of the tank. LNAPL (Soltrol 220 dyed red with Sudan IV) 32 was then pumped by peristaltic pump (Ismatec™ reglo analog MS-4/8) fluid pump 30 into tank 40 to form a body of continuous LNAPL, 48, between head tanks 42*a* and 42*b*. LNAPL was then circulated using pump 30. All plumbing was constructed of glass or Viton™ tubing. Two pump circuits, 50*a* and 50*b*, were constructed such that LNAPL could be pumped into the upstream head tank 42*a*, and pumped out of the downstream head tank 42*b* at the same rate. Two independent pump circuits were employed to prevent tracer from being introduced into the upstream head tank. Mixing apparatus, 52, which will be described in detail hereinbelow, and mixing pump, 54, were adjusted such that well 12 remains mixed, but tracer loss is not significant. Additionally, well fluid is pumped past a fluorescence detector (not shown in FIG. 4) whereby the time dependence of the tracer in well 12 can be determined.

Fluorescent intensity was measured using a 470 nm light emitting diode for exciting the tracer, the light from which was directed into a first fiber optic cable immersed in the LNAPL. A second fiber, located adjacent to the first fiber, transmitted fluorescence from the fluid to a grating spectrometer, the output of which was converted to a digital signal, and transmitted to a computer for controlling the spectrometer and displaying a graph of the resulting spectrum (intensity vs. wavelength). The computer controlled spectrometer is designated as callout 56 in FIG. 4.

Fluorescence readings were recorded at 480 nm, 580 nm, 582 nm, and 584 nm at between 1 and 5 min. intervals depending on the test conditions. Recordings of the 580 nm emission were used to determine the flow rate through the well, since tracer emission is large at this wavelength. The remaining channels (582 nm and 584 nm) were used to verify the measurements at 580 nm. While 580 nm was selected to determine the flow rate, any wavelength within the emission band of the tracer that can be readily detected should produce similar results.

Figure 5:
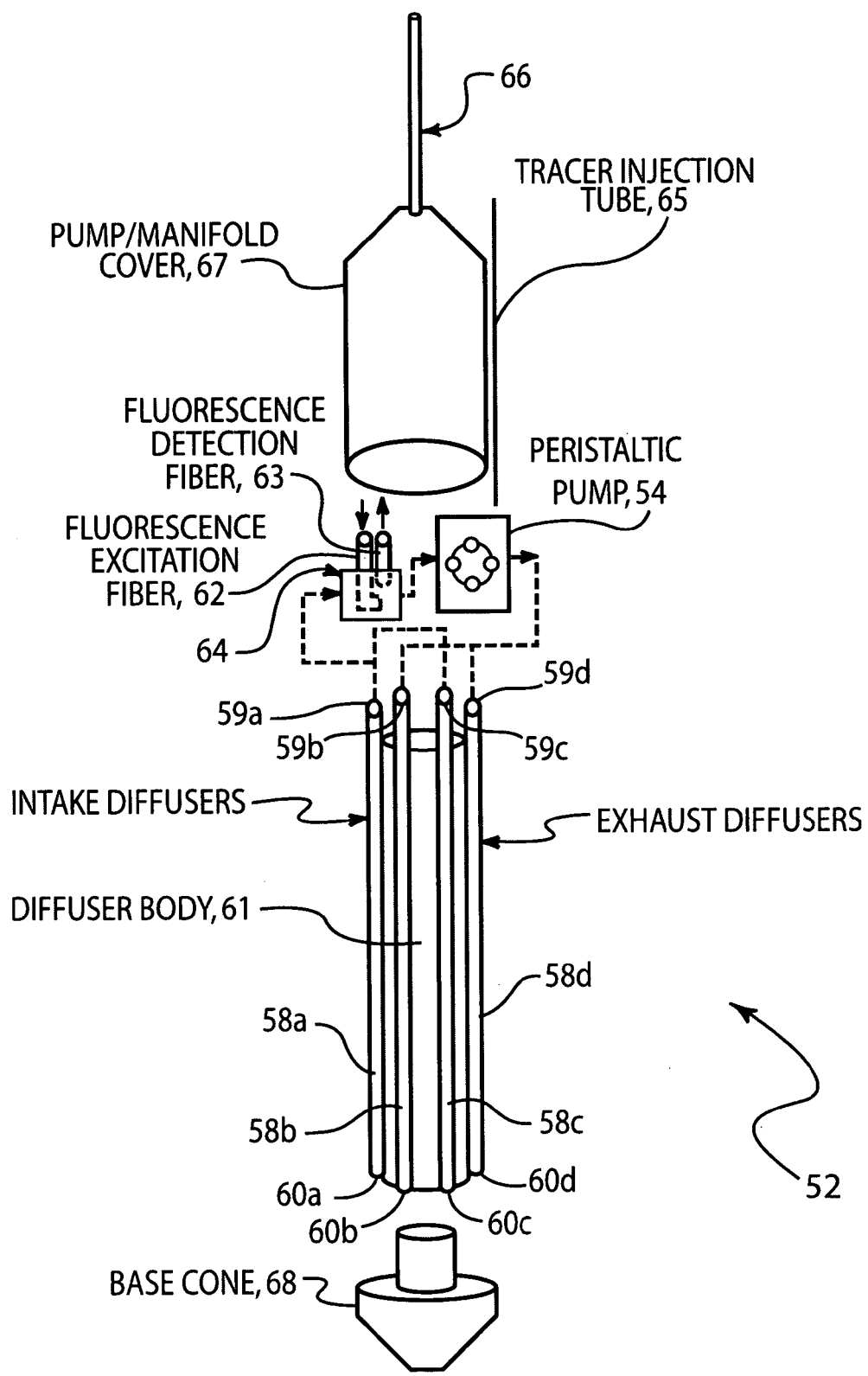
FIG. 5 is a schematic representation of an exploded view the diffusive mixer of the present invention used both for laboratory and down-hole field studies, illustrating, in particular, a tracer introduction tube.

FIG. 5 shows a schematic representation of an exploded view of diffusive mixer 52 of the present invention used for both laboratory and down-hole field studies. For the laboratory experiments, four, thin-walled diffuser tubes, 58*a*-58*d*, were constructed from 0.5 mm (0.02 in.) by 6.4 mm (0.25 in.) stainless steel having pinholes disposed therein were secured on the sides of 1.3 cm (0.5 in.) square metal bar approximately 50 cm in length. Two rows of 0.6 mm (0.02 in.) diameter holes drilled on 5 cm (2 in.) centers 180° apart and vertically offset by 2.5 cm (1 in.) were used. Clearly, greater or fewer tubes can be used depending on mixing requirements. Tubes 58*a*-58*d* had open ends 59*a* and 59*c* attached to the input port of pump 54, and open ends 59*b* and 59*d* to the output port of pump 54. The opposite ends, 60*a*-60*d*, of tubes 58*a*-58*d*, respectively, were closed. As will be described hereinbelow, for the field experiments, tubes 58 were attached to body, 61, as shown in FIG. 5. In operation, peristaltic pump 54, was used to pump LNAPL from the well structure (FIG. 4 hereof) through oppositely disposed diffuser tubes 58*a* and 58*c* and into manifolds (not shown in detail in FIG. 5; dotted lines indicate the direction of fluid flow) where the LNAPL was further mixed. The freshly mixed LNAPL and tracer were returned to the well by pump 54 through diffuser tubes 58*b* and 58*d*. Fluorescence excitation optical fiber, 62, and fluorescence detector optical fiber 63 are placed within the manifold (indicated in part by callout, 64) in the vicinity of the intake to pump 54. Tracer injection tube, 65, permitted the introduction of chosen amounts of tracers into the well structure. For the field experiments, support cable, 66, connected to cover 67 would enclose or otherwise support injection tube 65, fiber optic cables 62 and 63 leading to an excitation source and to a spectrometer disposed on the surface, respectively, and an electrical, mechanical, pneumatic, or hydraulic power source (not shown in FIG. 5) for pump 54.

The pumping rate for mixer 52 was controlled to ensure the well contents remained thoroughly mixed, but not sufficiently high, to encourage tracer losses. Gradients in the well are to be avoided in order reduce tracer dilution.

Chemically resistant materials, such as stainless steel, Viton™ and glass were used. The hollow tool body isolates the LNAPL, thereby reducing active volume and requiring smaller amounts of tracer. For field experiments, manifold cover, 66, and base cone, 68, used to protect diffusive mixer 52, have tapered ends to enable the diffuser to more readily slide into and out of well 12 (FIG. 1 hereof).

Flow measurements over a representative range of known flow rates using three different LNAPL thicknesses were made. A steady LNAPL flow was established by setting the desired LNAPL flow rate and monitoring the fluid levels in the head tanks. Data logging began at the four wavelengths prior to the tracer introduction. For the laboratory experiments, a dilute mixture of the tracer (BSL 715006) and LNAPL (10% tracer) was then injected into the diffuser system to achieve approximately twenty parts per million tracer in the LNAPL. Only a portion of the dilution curve was found to be necessary to determine the flow rate. In an attempt to determine the lower detection limit of the tracer dilution technique, a test was conducted after the circulation pump had been turned off for a long period of time. It was thought that the flow in the tank was zero; as such the test was designed to evaluate the magnitude of the other loss mechanisms discussed previously.

Once a steady state was reached, as was visually determined from the fluorescence data, a starting point for data recording which maximized the number of readings possible was chosen. This point varied from 3 to 30 hours after the initial mixing occurred, depending on the rate of dilution, and mixing. Occasionally, a number of starting points were selected to verify that the flow rate prediction is independent of the selected starting point. The data recorded after the chosen starting point was then isolated and normalized to the initial reading. To calculate the flow rate, a least squares regression was performed to fit the data to the governing equation, Equation (3). A dimensionless analysis was performed on the selected data with this data being normalized to the maximum reading (C'). If the slope of the best fit exponential equation was not ~0.693, a new start point was selected, later in the data set, and the analysis repeated.

Figure 6:
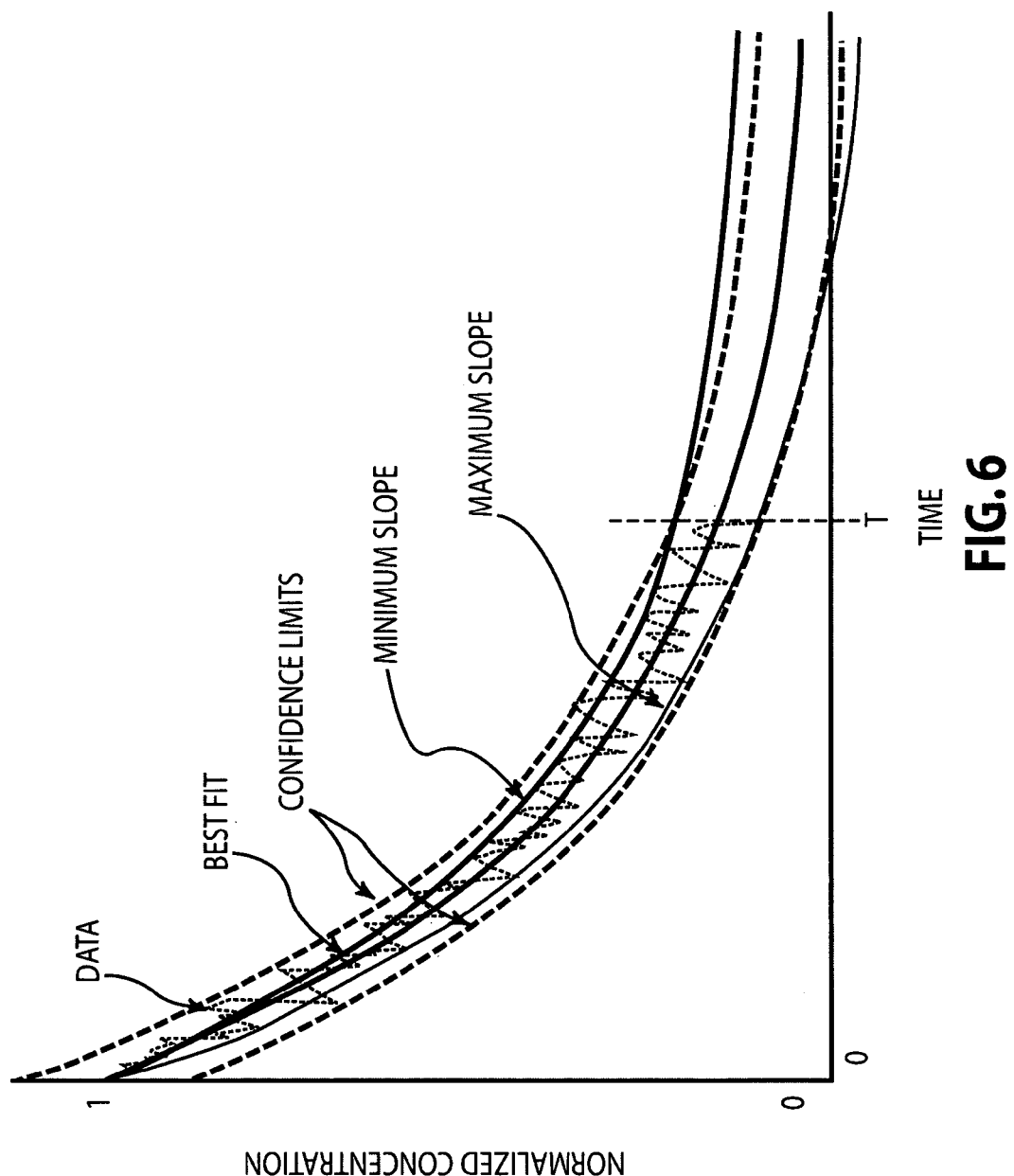
FIG. 6 is a graph conceptually illustrating the error analysis performed with the data obtained using the method and apparatus of the present invention.
Figure 7:
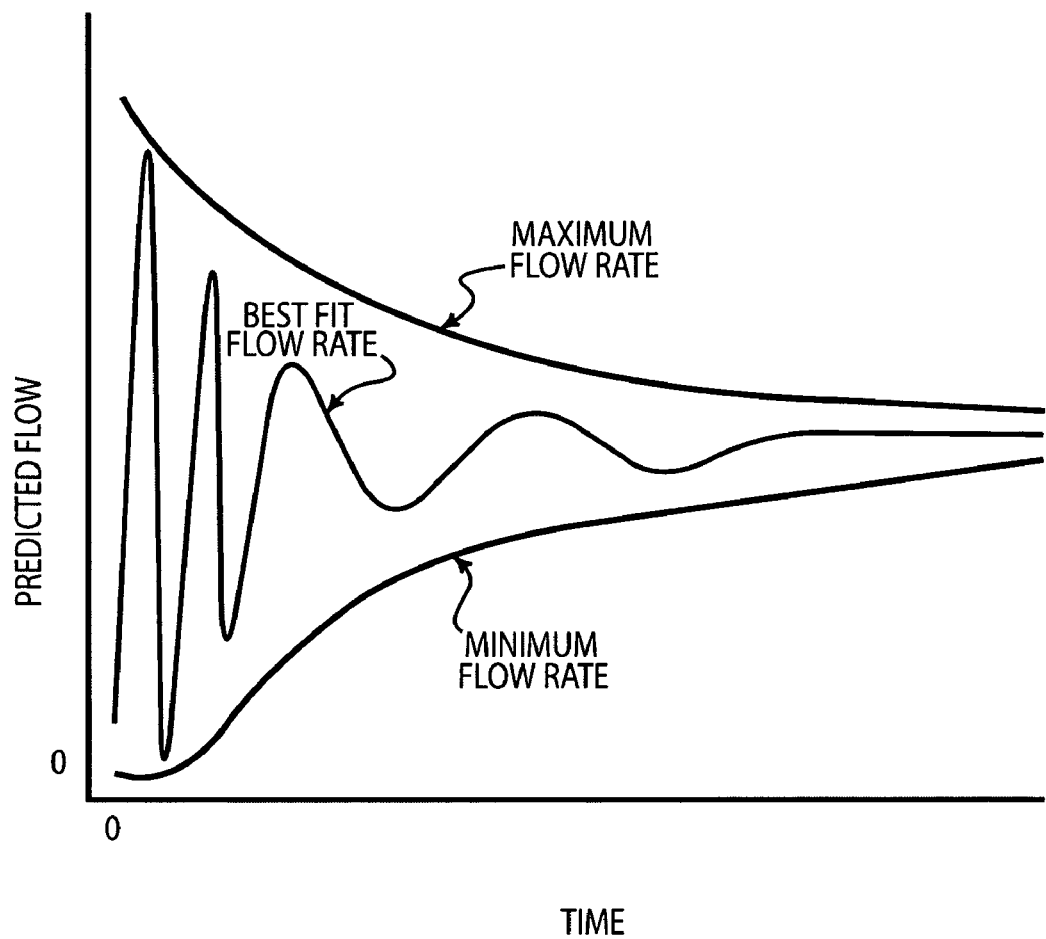
FIG. 7 is a graph conceptually illustrating the analysis of the number of data points required to achieve meaningful flow rates.

This procedure is repeatable, certain, and has an adequate measure of the error, using confidence limits of the data, to determine maximum and minimum flow rates based on a chosen confidence level. The results from this procedure are dependent only on the error between the data and the governing equation which best fits the data. The procedure bounds the best-fit governing equation with upper and lower confidence limits. Two additional curves are defined by fitting the model to the maximum and minimum flow rates for which the generated curve remains within the confidence limits. These curves are defined by fitting the model through the y-intercept of the best fit curve (which is the initial condition) and the last point of the upper and lower confidence limits, for which the generated curve remains within the bounds of the confidence limits. The procedure is dependent only on the error between the model and the actual data to produce a measure of the uncertainty in the flow rate measurement. FIG. 6 is a graph conceptually illustrating the analysis of the data obtained from the practice of the present invention.

To minimize the time required for acquiring data, the error analysis was performed data collected during the first few minutes of selected data collection. The amount of data was then increased and the process repeated until all of the selected data was analyzed. The maximum, minimum and best fit flow predictions were plotted as predicted flow as a function of the quantity of data used. Flow predictions oscillate when little data is employed, but eventually reach a steady solution, as more data is used for the analysis. When the predicted flow rate becomes steady is indicative of the minimum amount of data required to accurately obtain the flow rate through the well. With additional data, the maximum and minimum flows converge toward the best fit flow rate, and reduce the uncertainty in the flow rate. By using this type of error analysis, it is possible to determine how long a test must be run in order to obtain a flow rate within a given tolerance.

Figure 8:
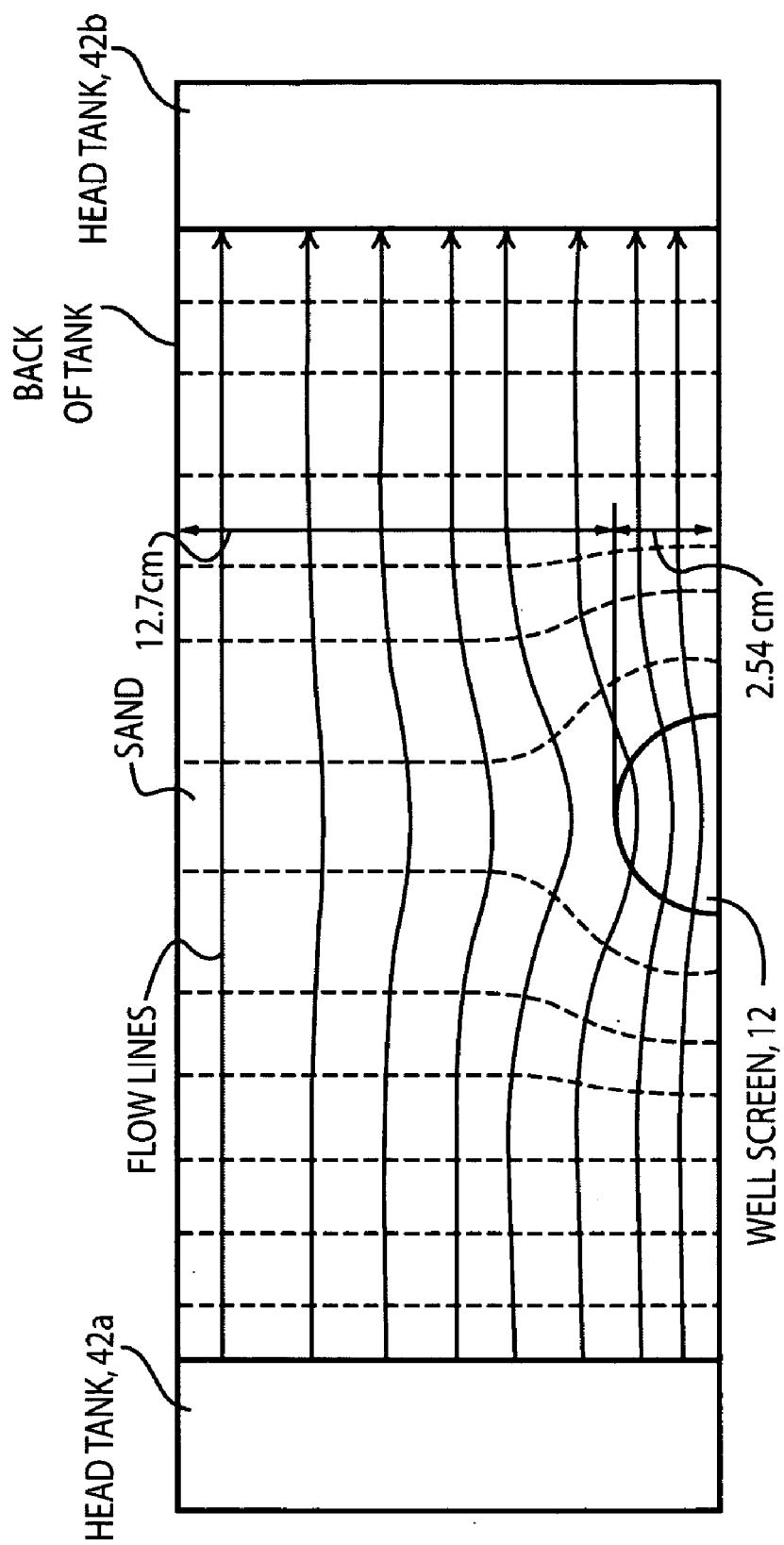
FIG. 8 shows a plan view of the calculated flow lines in the test tank illustrated in FIG. 4 hereof.

The flow rate in the tank was varied from 0.013 L/d to 3.9 L/d at LNAPL thicknesses of 9 cm, 13 cm, and 24 cm. The measured flow rate through the well was compared to the flow rate in the tank for each run. If the well screen had the same conductivity as the formation, then the flow rate measured through the well should be 17% (⅙) of the total flow through the tank. Because the well is more conductive than the formation, the flow lines will tend to converge about the well, thereby increasing the flow therethrough, as shown in FIG. 8 hereof which illustrates a plan view of the calculated flow lines in tank 40 in FIG. 4, hereof. Therefore, the tracer dilution method should predict a flow rate through the well of more than 17% of the total tank flow. This convergence has been observed for water flow, and is typically two times that of the well screen. If this number applies for LNAPL flow, the tracer dilution method should estimate a flow rate through the well of approximately 34% of the total flow in the tank.

A 9 cm thick layer of LNAPL, and a LNAPL flow rate of 3.0 L/d, which corresponds to a volumetric flow rate per unit width of 6.9 $m^3/m/y$ (75 $ft^3/ft/y$) was used. The data set, best fit curve, and 95% confidence intervals for the first test are plotted in FIG. 9. The data fits the governing equation well, and the calculated flow rate is 1.02±0.01 L/d or 34% of the 3 L/d of total flow in the tank, which is consistent with the expected result. To test the repeatability of the results, a second test was conducted at a similar flow rate (2.9 L/d). The data was found to fit the model well and predict a flow rate through the well of 0.98±0.01 L/d or 34% of the 2.9 L/d of flow through the tank, indicating that the measurements are repeatable.

Figure 10A:
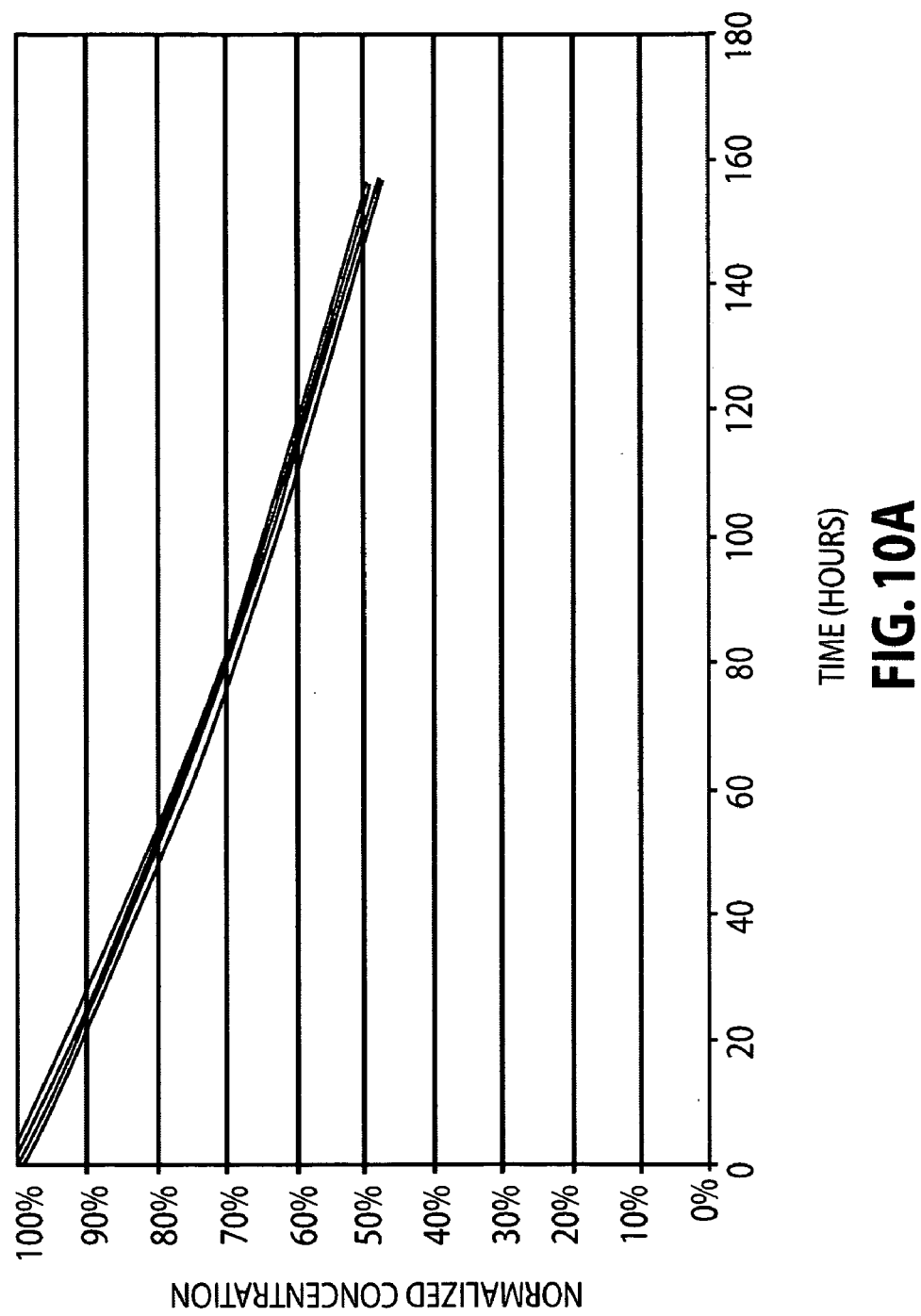
Figure 10B:
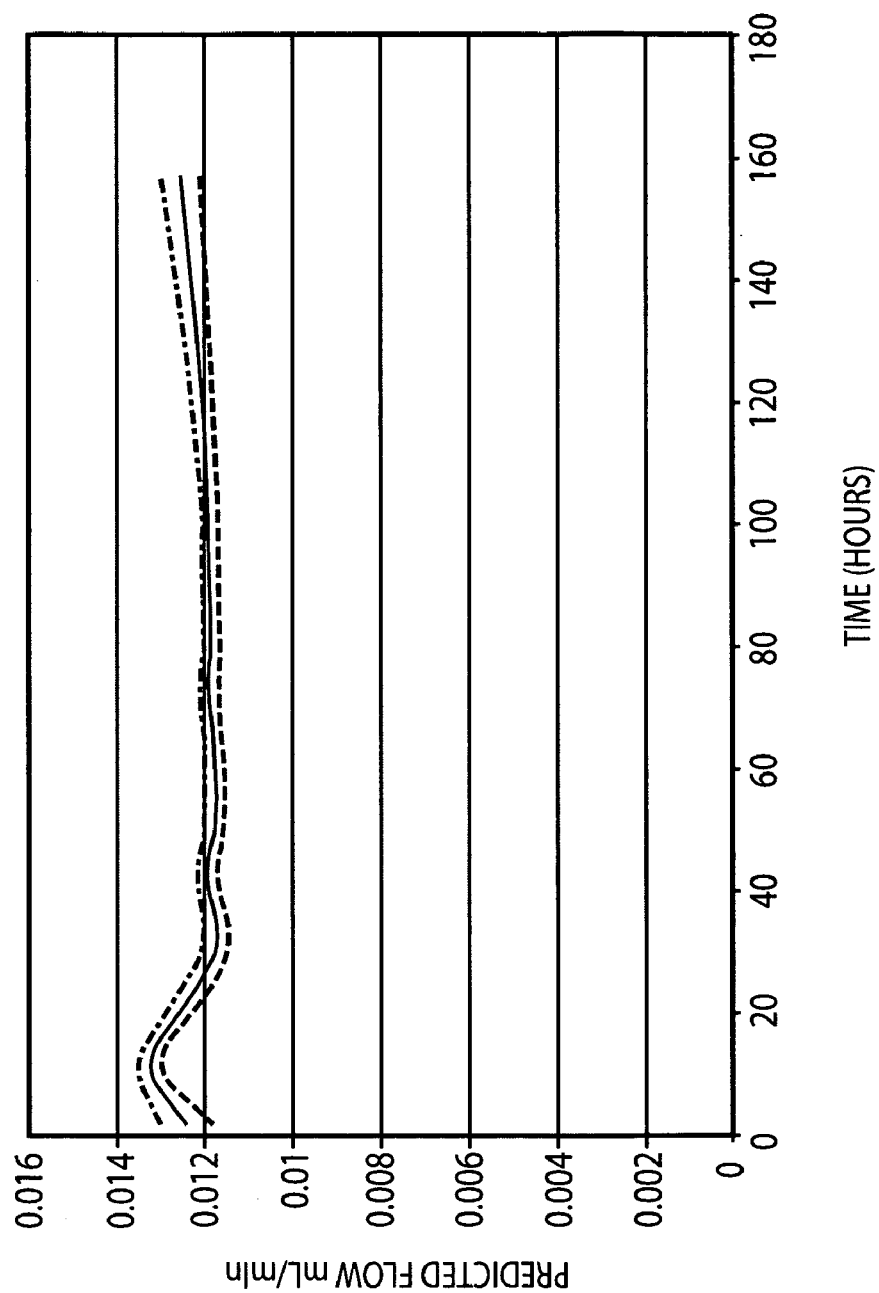
FIG. 10B is a graph of the time-step analysis results described in FIG. 7 hereof for a LNAPL flow of 0.17 $m^3$/m/y and a thickness of 9 cm.

The results for a flow rate of 0.072 L/d (0.173 $m^3/m/y$) and the dilution method repeated. The results of this experiment are shown in FIG. 10A hereof. The data fit the model well and a flow rate of 0.019±0.001 L/day or 25% of the total flow in the tank was predicted. Because of the reduced flow rate, it was impractical to record the entire dilution curve. To determine if sufficient data had been collected, the time step analysis process described hereinabove was applied. The results of this analysis are shown in FIG. 10B.

To determine the reliability of these measurements, the test was repeated with a flow rate of 0.086 L/day. A flow rate through the well of 0.023±0.001 L/day or 26% of the total flow in the tank was calculated. This duplicate test shows some deviation from the original, but the difference is small. The flow rate in the tank was lowered to 0.013 L/day (0.031 $m^3/m/yr$). A flow through the well of 0.003±0.001 L/day, or between 23% and 27% of the tank flow was calculated. The error for this test was large due to the low flow. After the test at a flow rate of 0.031 $m^3/m/yr$, the LNAPL thickness in the formation was increased to 14 cm and three flow rates were measured. The LNAPL thickness was increased to 25 cm, and three flow rates were measured, all using the same procedure. The results from these tests are set forth in table 1 and plotted in FIG. 11 as flow rate in the tank percent of flow measured through the well as a function of flow rate.

The diamonds show the results for the 9 cm-thick LNAPL layer, the circles, the 13 cm-thick layer, and the squares, the 24 cm-thick layer.

TABLE 1

Results From The Tank Tests

| LNAPL Thickness | Tank Flow Rate (L/day) | Flow Rate Through Well (L/day) | % of Tank Flow Through Well | Maximum % | Minimum % |
|---|---|---|---|---|---|
| 9 cm | 3.024 | 1.01 | 33% | 34.0% | 32.7% |
|  | 2.880 | 0.97 | 34% | 34.3% | 33.3% |
|  | 0.720 | 0.18 | 25% | 25.3% | 24.8% |
|  | 0.072 | 0.02 | 25% | 26.1% | 24.3% |
|  | 0.086 | 0.02 | 26% | 27.0% | 25.7% |
|  | 0.013 | 0.00 | 25% | 27.2% | 23.4% |
| 13 cm | 0.020 | 0.00 | 25% | 27.3% | 21.8% |
|  | 0.432 | 0.10 | 23% | 23.1% | 22.5% |
|  | 3.888 | 0.85 | 22% | 22.2% | 21.8% |
| 24 cm | 0.100 | 0.037 | 37% | 38.3% | 35.4% |
|  | 0.792 | 0.23 | 29% | 30.2% | 27.6% |
|  | 2.880 | 0.81 | 28% | 28.9% | 27.5% |

Figure 9:
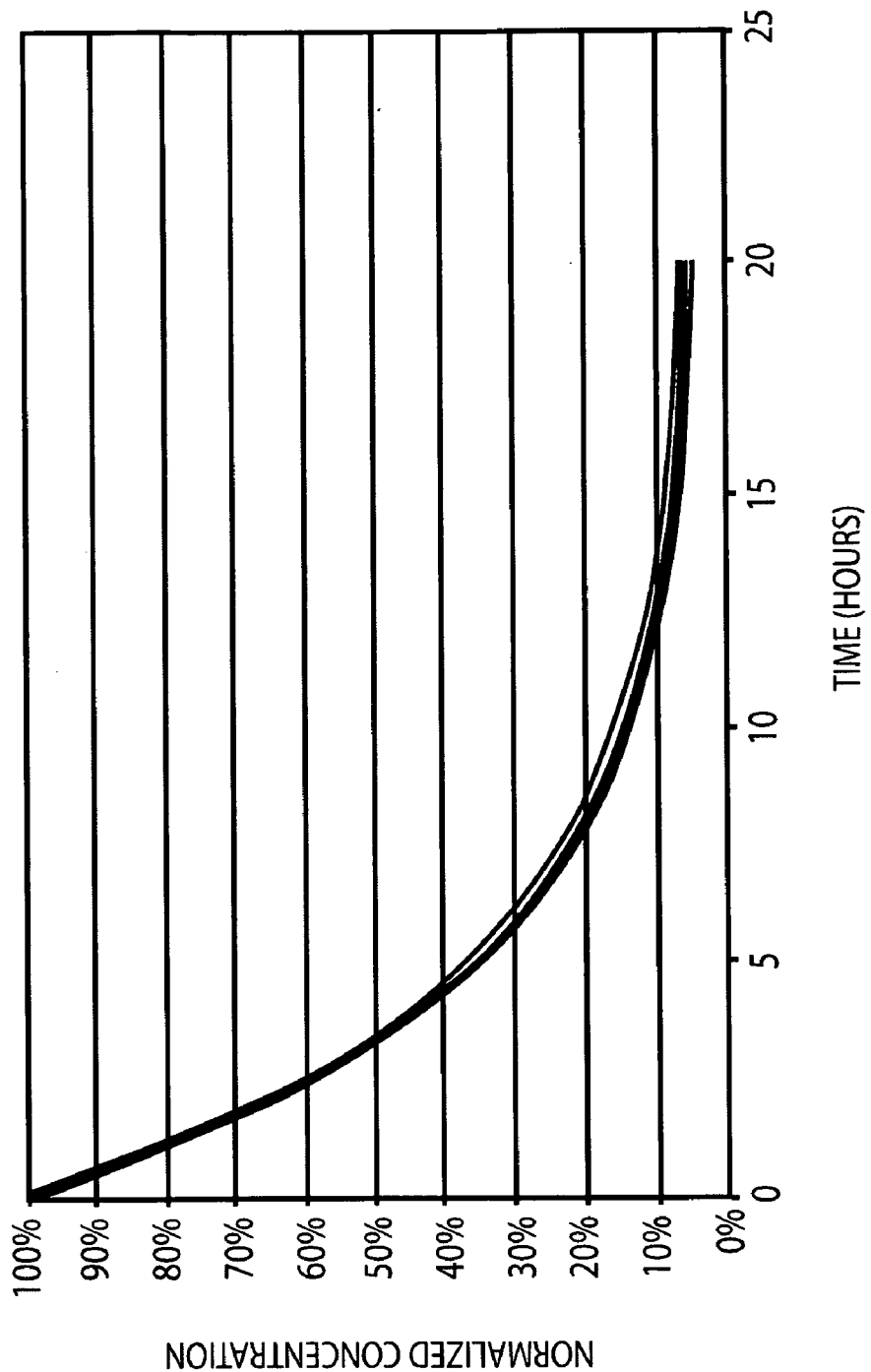
FIG. 9 is a graph of test tank dilution results for a LNAPL flow rate of 6.9 $m^3$/m/y and thickness of 9 cm.

Plotting the test runs in this format suggests that no distinct trend exists between flow rate and percent of flow measured through the well. The results are between 22% and 34% of the total tank flow, which corresponds to a convergence factor of between 1 and 2 times the well radius (or diameter if the tank has used a full well). A range of 22% to 34% certainly satisfies that criteria. Moreover, the collected data fits the model well, as shown in FIGS. 9 and 10A.

Figure 11:
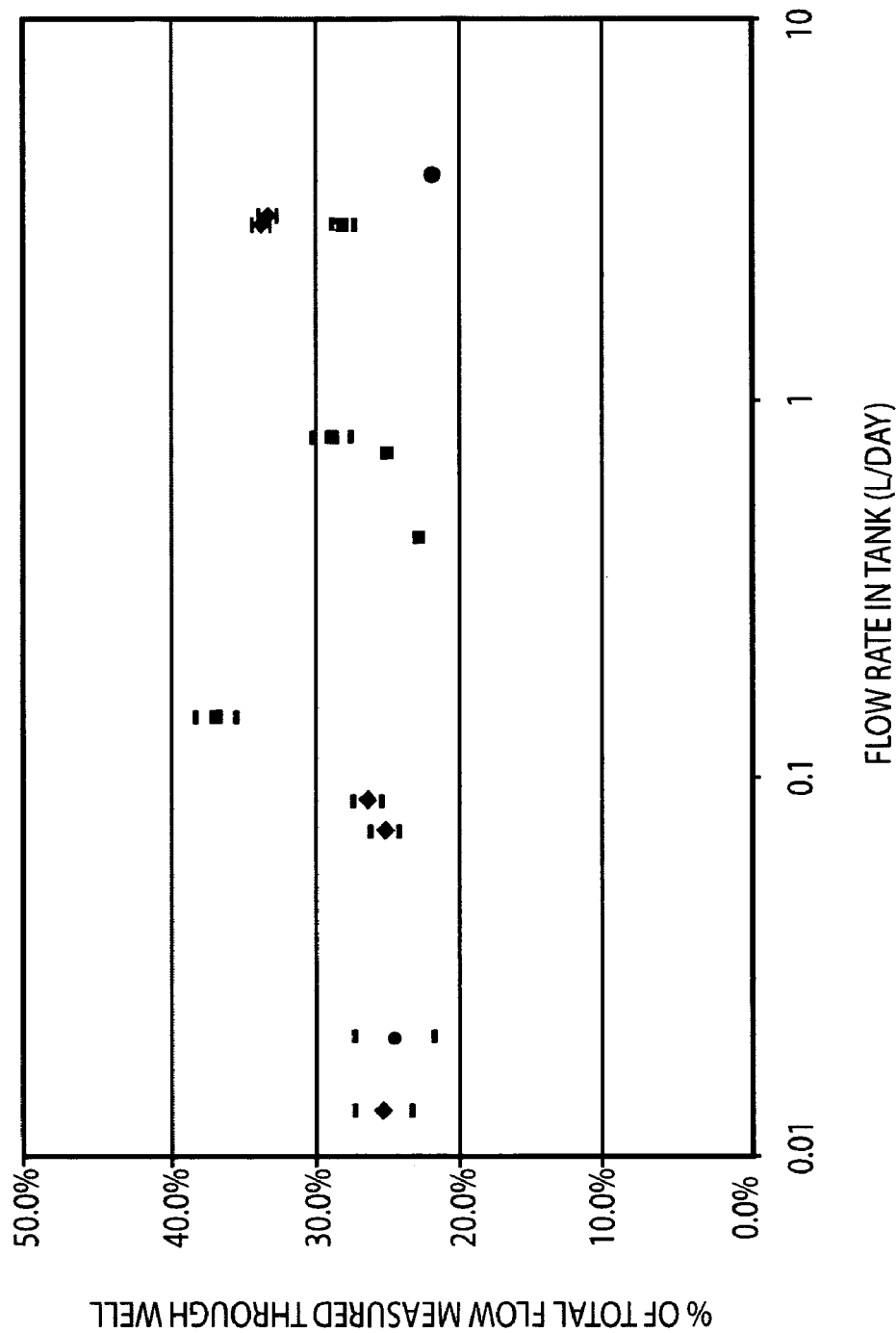
FIG. 11 is a graph of the test tank data performed in accordance with the teachings of the present invention, showing that no distinct trend exists between flow rate and percent of flow measured through the well.

FIG. 11 shows that at medium to high flow rates the errors associated with the tests are small. As the flow rate decreases the error is seen to increase. At the low flow rates, it was expected that other loss mechanisms might start to affect the results by increasing the calculated flow through the well. The thin and medium thickness tests, at low flows, do not show this behavior. The fact that the flow predictions do not show a higher percentage of flow suggests that the effects of the other loss mechanism are small compared with the lowest flows explored. The results of these tests demonstrate that the lower limit of the dilution method is less then 0.03 $m^3$/m/yr.

As stated, the range of flow rates for which the dilution method has been shown to be accurate varies from 0.035 $m^3$/m/yr to greater than 7.2 $m^3$/m/yr, the extent that flow converges about a well, for the stated test conditions, is between 1 and 2 times the well screen diameter, and this convergence is not a strong function of the flow rate. Therefore, it is expected that although different formations and well screen types may produce a variety of convergence factors, the convergence factor is not a function of the LNAPL flow rate.

Zero flow (static) tests were performed. Results show that the mixing device may contribute to tracer migration at low flow rates. However, when the mixing rate is moderate to low, the effects of mixing are minimal, demonstrating that the mixing rate during the test should not be any higher than necessary, to ensure the mixing does not contribute to tracer dilution. The results of an analysis of the data show a flow of 0.003±0.001 L/day (~0.03 $m^3$/m/yr). When the data is compared to the expected result in the dimensionless format, the data has a slope of 0.695, while the expected slope is 0.693. If tracer losses were due to other loss mechanisms, the results would not fit the model for flow as closely. Moreover, the estimated flow rate from the static test is almost identical to the low flows explored, and if loss mechanisms were high during those tests, the results of low flow tests would have indicated a much higher flow rate. In the static test, the LNAPL was added to the head (upstream) tank at a high flow rate, and the tank allowed to equilibrate with no pumping for an extended period of time. During that time, LNAPL migrated from the head tank, through the formation, and into the downstream tank. Theoretically, this process follows an exponential curve (similar to the dilution curve), so the flow through the formation will approach but never reach zero. The results of the static test suggest that there was a small flow of LNAPL, and the present dilution method was able to measure this residual flow.

Tests conducted far indicate the present dilution method accurately measures flow rates as low as 0.014 L/day.

EXAMPLE 2

Field experiments using the tracer dilution method of the present invention were undertaken to measure LNAPL flow in a site along the south bank of the North Platte River northeast of Casper, Wyo. impacted by NAPL releases. To contain and clean up these contaminated areas, recovery wells and hydraulic barriers have been installed; in total, more then one million gallons of NAPL have been recovered from the North Platte Alluvium. Among the potential end points for the recovery operations discussed would be when the remaining NAPL has reached an inconsequential flow rate. The present invention was tested in five locations: one location was near a recovery well where the NAPL flow was anticipated to be high, while the others were in a potentially stable region where the NAPL flow was likely to be lower. The selected wells were monitored weekly in an attempt to resolve the stability of the fluid levels prior to conducting the tests. The equipment used in the field study is described hereinbelow. Wherever possible, the field equipment was the same, or modeled after the equipment used in the laboratory tests.

Diffusive mixer, 52, described hereinabove in EXAMPLE 1 and shown in FIG. 5 hereof, was modified slightly for down-hole use, the basic concern being keeping the tracer concentration uniform within the well. The down-hole mixer included six, 0.64 cm (0.25 in.) diameter by 91 cm (36 in.) long, thin wall stainless steel tubes, shown in FIG. 5 as 58a-58d, having two rows of 0.6 mm (0.024 in.) diameter pinholes drilled on 5 cm (2 in.) centers, 180° apart. The diffuser tubes were disposed equally spaced around a 2.54 cm (1 in.) diameter thin wall stainless steel tube, 61, and connected, by means of stainless steel manifolds (not shown in FIG. 5), to a pneumatic diaphragm pump, 54. The pump was driven using an airline connected to a surface-mounted pulsing air pump (not shown in FIG. 5).

To measure the fluorescence of the tracer, a hose attached to the intake manifold was fitted with a tee connection, 64, with the end of a 10 m (33 ft) fiber-optic cable inserted in the top of the tee. The intake to the pump was then located on the side of the tee. The tee connection on the exhaust diffuser was an "L" shaped connecter. The manifold was connected to the pump using Viton™ hose. A 0.3 cm (0.13 in.) wire cable 66 was attached to the pump/manifold cover, 67, of the mixer to permit location thereof within the well. Cover 67 was constructed from a 3.8 cm (1.5 in.) stainless steel tube, and enclosed pump 54 and fiber optic cable. The top of cover 67 was tapered at 30° to allow mixer 52 to be easily moved upwards through the well casing. A second cap, 68, also tapered, was installed at the bottom of mixer 52 to hold the diffuser tubes in place and allow mixer 52 to be easily moved down through the well casing. Tracer injection tube, 65 (0.15 cm ID) was directed from the surface, past the outside of pump cover 67 into the LNAPL zone, such that tracer could be injected into the well from the surface.

In operation, mixer 52 draws LNAPL into three opposing diffuser tubes via the small holes. The diffusers mix the tracer without disturbing the equilibrium in the well. The mixed flow then passes into the sampling tee and past the fiber optic cable, so the concentration readings represent the well contents. After flowing through the pump, the mixed flow is separated into three streams via the exhaust manifold and flows back into the well through the remaining three diffuser tubes. Mixing the tracer in the manifolds of the mixing device has been found to reduce in-well gradients. The diffusers are positioned to extend past the water LNAPL interface so the same mixing device can be used in a variety of LNAPL thicknesses. Given sufficiently low flows, the density difference between the LNAPL and the water prevents water from being pulled through the diffuser tubes. However, when the LNAPL thickness is small relative to the mixer length, the pumping speed is decreased to reduce water mixing with the LNAPL and forming an emulsion.

Hollow body 61 provides a base for the diffusers as well as isolating a volume of LNAPL in the well. Isolating part of the LNAPL has been found to have a number of benefits: (1) the amount of tracer required is reduced; (2) the time required to mix the tracer is reduced; (3) the active volume of LNAPL in the well (mixing cell) is reduced, which causes the tracer to decay faster, thereby increasing the sensitivity of the measurements; and (4) the displacement of the tool is minimized, which reduces any gradients surrounding the well when the mixer is inserted. The diffusive mixer hereof has been found to be effective for measurements in LNAPL thicknesses of between about 6 in. and 36 in. with no adjustments.

A spectrometer and a computer, similar to those used in the laboratory experiments, were located at the surface, enclosed in a steel, weather-resistant box, and used to record the tracer concentration. A surface-mounted pulsing air compressor and a downhole airline were used to drive the downhole pneumatic pump.

During the test, the spectrometer and computer recorded data at the four wavelengths identified hereinabove: 480 nm, which is approximately the incident wavelength of the spectrometer, and retains an approximately constant intensity unless the pump failed or an air bubble formed at the detector; the second and third channels recorded were at 545 nm and 580 nm, respectively, and record the two peak values associated with the fluorescence of the tracer, following a similar trend as a function of tracer concentration; and the fourth wavelength, 700 nm, was used to resolve changes in the background readings during the test. Readings were recorded approximately every minute. At the conclusion of the tests, data from the 580 nm wavelength was fitted to the exponential model by a least squares regression to predict the flow through the well.

The spectrometer was found to be temperature sensitive. Therefore, the spectrometer and the laptop computer employed were placed in a weather-proof enclosure having a temperature regulator to maintain approximately constant temperature. In addition, instruments were included in the enclosure to measure the position of the water table and the temperature in the enclosure as a function of time.

Wells selected for the field demonstration were constructed using 2 and 4 in. PVC well screens with 0.5 mm (0.020 in) slots. The wells were installed using a 20 cm (8 in.) hollow stem auger and have a 5 cm (2 in.) gravel pack of 10-20 silica sand. Tests were conducted in a well which is located approximately 12 m (40 ft) away from an active recovery well. This well was screened from 0.9 to 9 m (3 ft to 30 ft) below ground. During the dilution test, the LNAPL thickness in the well was approximately 30 cm (12 in.). The depth to the LNAPL was 2.7 m (9 ft). The other test was conducted in an observation well which was screened from 4.8 to 7.9 m (16 ft to 26 ft) below grade, and during the test there was approximately 23 cm (9 in.) of LNAPL located 5.4 m (18 ft) below grade.

Both wells were 10 cm (4 in.) in diameter, whereas the down hole mixing device was designed to fit into a 5 cm (2 in.) well. It was found that the greater active volume (5 times that of a 5 cm (2 in.) well with the mixer inserted, reduced the sensitivity of the measurements, which was overcome, in part, by running the tests for a longer time period.

Analyses of the results from the recovery well indicate a flow of 0.07±0.01 L/d through the well. Depending on the well convergence factor, which most likely varies from 1 to 2 times the well diameter (in accordance with the laboratory test data of EXAMPLE 1 hereof, the flow rate in the formation, per unit width of LNAPL body, is 0.1 to 0.3 $m^3/m/yr$ (~1 to 3 $ft^3/ft/yr$). As an alternative to least squares regression, a visual curve analysis can be used to fit the data, and both procedures were found to agree well. The measured flow rate was then used to calculate the production rate of the nearby recovery system. Results of the calculations show that during the test (a very active period) the production system was producing 11 to 30 liters (3 to 8 gal.) of LNAPL per day. Although the actual production rate is unknown, a bail down test had been conducted at this well for similar initial fluid levels. By using the transmissivity calculated from the bail down test and the results of the dilution test, the LNAPL table gradient can be estimated. Calculations estimate the local LNAPL gradient to be between 0.0003 and 0.0007. Although there was insufficient site data to conclusively determine if the dilution method correctly estimated the LNAPL flow, the estimated production rate and LNAPL gradient calculations are consistent with conditions at the time of the test.

The test conducted in the observation well predicted a flow of less then 0.005 L/day through the well. Because of the extremely low flow combined with current limitations of the equipment and extreme temperature variations during the test, the data did not follow a typical decay curve. A least squares regression predicted a flow rate of 0.003 L/d. However, due to the large errors and resulting poor fit, the slope of this curve and the resulting flow rate calculations were not significant. When curves were visually fitted to the late time data, the resulting flow rates are estimated to be between zero and 0.005 L/d. The results of this test suggest there is no flow through this well, and the product in the area is stable.

The error analysis developed for the laboratory studies was also performed on this latter data. The results confirmed that the error was large and varied from approximately zero to 0.005 L/d. The results of the time step analysis described hereinabove demonstrated that the solution did not converge; that is, the flow rate is a function of how much data is used in the regression analysis. However, the data collected clearly demonstrate a near zero flow that is below the detection limit of the current method.

Although there are many improvements that may be made to the apparatus employed in the field study, and transient flow conditions remain a problem for consideration, the dilution method of the present invention has been successfully demonstrated as a field diagnostic. Dimensionless analysis described hereinabove was found to be useful for determining when data is due to tracer dilution alone, and when the apparent tracer dilution is due to other processes. Diffusive losses were found to be relatively small when compared to the LNAPL flow rates employed in the tests. An accurate determination of the convergence factor may be important for calculating the flow rate of LNAPL in a formation. One finds that this convergence factor is proportional to the contrast in permeability between the well and the formation. For groundwater, this ratio is simple to determine; however, LNAPL conductivity varies vertically as a function of saturation, and the convergence is more difficult to determine. The type of well screen and the drilling technique may also affect the convergence. Tracer dilution, therefore, provides a direct measure of LNAPL flow rates. The present method does not require the complex and indirect measurements that are presently used to measure LNAPL flow.

As described hereinabove, the first field test was conducted near an active recovery system and measured a flow rate of 0.1 m³/m/yr to 0.3 m³/m/yr. The second field test, conducted in a quiescent area, determined that the flow rate of LNAPL was less than 0.009 m³/m/yr. These field experiments demonstrate that the tracer dilution technique is an accurate means to measure LNAPL flow rates.

The foregoing description of the invention has been presented for purposes of illustration and description and is not intended to be exhaustive or to limit the invention to the precise form disclosed, and obviously many modifications and variations are possible in light of the above teaching.

For example, although the tests performed using the method and apparatus of the present invention assume that the flow rate through the well is constant for the duration of the test, it may be possible to measure a varying flow rate by tracer dilution tests.

As would be apparent to those having skill in the art after having read the present disclosure, tracers other than fluorescent tracers may be used in accordance with the teachings of the present invention to measure the concentration of introduced species.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A tracer dilution method for measuring the flow rate of a non-aqueous phase liquid through a porous medium, comprising the steps of:
    placing a well or boring in the porous medium in the path of the flow of the liquid, whereby the liquid establishes a column within the well having a thickness;
    introducing a chosen quantity of a tracer into the well or boring, the tracer being soluble in the liquid and having a measurable quality related to the concentration of the tracer in the liquid;
    mixing the tracer with the liquid such that the resulting mixture is uniform;
    measuring the quality of the tracer as a function of time, thereby generating data characteristic the concentration of the tracer from which the flow of the liquid can be derived;
    correcting the data for the convergence of the liquid flow into the well or boring; and
    extracting the rate of flow of liquid from the corrected data.

2. The method of claim 1 further including the step of fitting the data to the equation $$C(t) = C_o \cdot e^{\frac{-Q_w}{\pi(\frac{D}{2})^2 b_w - V_{mixer}}t},$$

where C(t)=tracer concentration as a function of time; $C_o$=initial concentration at time zero; $Q_w$=flow rate through the well; t=time; D=well diameter; $b_w$=equilibrium thickness of the petroleum liquid column in the well; and $V_{mixer}$=displacement of the mixing device.

3. The method of claim 1, wherein said step of mixing the tracer with the liquid is achieved using a diffusive mixer.

4. The method of claim 1, wherein the tracer comprises a fluorescent material and the measurable quality comprises fluorescence.

5. The method of claim 4, wherein the fluorescent material comprises Stay-Bright™ part number BSL 715006.

6. The method of claim 4, wherein said step of measuring the fluorescence of the fluorescent material further comprises the steps of optically exciting the fluorescent material using light having a chosen wavelength thereby generating fluorescence therefrom, and detecting the resulting fluorescence.

7. The method of claim 6, wherein said step of detecting the resulting fluorescence further comprises the steps of spectroscopically resolving the wavelengths of the fluorescence, and detecting the intensity of chosen wavelengths.

8. A tracer dilution apparatus for measuring the flow rate of a non-aqueous phase liquid through a porous medium, comprising in combination:
    (a) a well or boring located in the porous medium in the path of the flow of the liquid;
    (b) means for introducing a chosen quantity of a tracer which soluble in the liquid into said well or boring;
    (c) means for uniformly mixing the tracer with the liquid; and
    (d) means for measuring the concentration of the tracer as a function of time, thereby generating data characteristic of the flow of the petroleum liquid.

9. The apparatus of claim 8, wherein said means for uniformly mixing comprises diffusive mixing means.

10. The apparatus of claim 8, wherein said diffusive mixing means comprises:
    a liquid pump having an input and an output;
    a body;
    at least one first tube mounted on said body and submerged in the liquid to be mixed, having a wall, an open end and a closed end and a plurality of holes or slots through the wall such that the liquid can pass therethrough, for receiving liquid to be mixed from the output of said pump through the open end thereof; and
    at least one second tube mounted on said body, submerged in the liquid to be mixed, having a wall, an open end in fluid contact with the input of said pump and a closed end, and a plurality of holes or slots through the wall such that the liquid can pass therethrough from inside thereof.

11. The apparatus of claim 10, wherein said liquid pump comprises a pneumatic diaphragm pump.

12. The apparatus of claim 10, wherein said liquid pump comprises a peristaltic pump.

13. The apparatus of claim 8, wherein the tracer comprises a fluorescent material.

14. The apparatus of claim 13, wherein the fluorescent material comprises Stay-Bright™ part number BSL 715006.

15. The apparatus of claim 13, wherein said means for measuring the concentration of the tracer as a function of time comprises means for optically exciting the tracer, thereby generating fluorescence therefrom, and means for detecting the fluorescence.

16. The apparatus of claim 15, further comprising means for spectroscopically resolving the wavelengths of the generated fluorescence.

17. A diffusive mixing apparatus, comprising in combination:
- a liquid pump having an input and an output;
- a body;
- at least one first tube mounted on said body and submerged in the liquid to be mixed, having a wall, an open end and a closed end and a plurality of holes or slots through the wall such that the liquid can pass therethrough, for receiving liquid to be mixed from the output of said pump through the open end thereof; and
- at least one second tube mounted on said body, submerged in the liquid to be mixed, having a wall, an open end in fluid contact with the input of the pump and a closed end, and a plurality of holes or slots through the wall such that the liquid can pass therethrough from inside thereof.

18. The apparatus of claim 17, wherein said liquid pump comprises a pneumatic diaphragm pump.

19. The apparatus of claim 17, wherein said liquid pump comprises a peristaltic pump.

20. The apparatus of claim 17, further comprising a tapered cover adapted for enabling said mixing apparatus to be lowered into wells or bores.

* * * * *